(12) United States Patent
Fraser (10) Patent No.: US 7,324,115 B2
(45) Date of Patent: Jan. 29, 2008

(54) DISPLAY LIST COMPRESSION FOR A TILED 3-D RENDERING SYSTEM

(75) Inventor: Christopher Fraser, London (GB)

(73) Assignee: Imagination Technologies Limited, Hertfordshire (GB)

( * ) Notice: Subject to any disclaimer, the term of this patent is extended or adjusted under 35 U.S.C. 154(b) by 0 days.

(21) Appl. No.: 10/860,335

(22) Filed: Jun. 3, 2004

(65) Prior Publication Data

US 2004/0222996 A1 Nov. 11, 2004

Related U.S. Application Data

(63) Continuation of application No. 10/171,304, filed on Jun. 12, 2002, now abandoned.

(30) Foreign Application Priority Data

Mar. 26, 2002 (GB) .................................. 0207152.0

(51) Int. Cl.
*G06T 15/00* (2006.01)
*G06T 11/40* (2006.01)
*G06T 15/50* (2006.01)
*G09G 5/00* (2006.01)
*G09G 5/36* (2006.01)
*G06K 9/36* (2006.01)
*G06K 9/60* (2006.01)
*G06T 9/50* (2006.01)
*G06K 9/54* (2006.01)

(52) U.S. Cl. ...................... 345/553; 345/419; 345/582; 345/552; 345/555; 382/232; 382/235; 382/305

(58) Field of Classification Search ........ 345/418–419, 345/422, 426, 428, 581–583, 589, 541, 530–532, 345/536–538, 544–545, 548–549, 552–556; 382/232–233, 254, 305; 348/563–570
See application file for complete search history.

(56) References Cited

U.S. PATENT DOCUMENTS

| 5,729,672 | A | * | 3/1998 | Ashton ....................... 345/589 |
| 6,466,217 | B1 | * | 10/2002 | Hsieh et al. ................. 345/503 |
| 6,747,649 | B1 | * | 6/2004 | Sanz-Pastor et al. ........ 345/428 |
| 6,897,858 | B1 | * | 5/2005 | Hashimoto et al. ......... 345/419 |

(Continued)

FOREIGN PATENT DOCUMENTS

GB 2 343 603 10/2000

(Continued)

OTHER PUBLICATIONS

European Search Report dated Sep. 21, 2005 (2 pages).

(Continued)

*Primary Examiner*—Wesner Sajous
(74) *Attorney, Agent, or Firm*—Flynn, Thiel, Boutell & Tanis, P.C.

(57) ABSTRACT

A 3-dimensional computer graphics rendering system receives object data for a scene to be rendered. This includes vertex data and index data. The scene is subdivided into priority of rectangular areas (202). Object 8 of each rectangular area in the scene is assembled (203) and subsequently compressed (207). This data can subsequently be retrieved and decompressed and used for producing a properly shaded and texted image for display.

31 Claims, 9 Drawing Sheets

U.S. PATENT DOCUMENTS

2001/0055032 A1    12/2001  Saito et al.
2002/0118188 A1*    8/2002  Zviaguina et al. .......... 345/421
2002/0171644 A1*   11/2002  Reshetov et al. .......... 345/420

FOREIGN PATENT DOCUMENTS

WO    WO 01/95257         12/2001
WO    WO 03/010717 A3     2/2003

OTHER PUBLICATIONS

"Tracking Graphics State for Networked Rendering", Ian Buck, et al., Proceedings of the 2000 Eurographic Workshop on Graphics Hardware, 2000, pp. 87-95 (9 pages).

"Geometry Compression", Michael Deering, Computer Graphics Proceedings, Aug. 6-11, 1995, pp. 13-20 (8 pages).

"Distributed Rendering for Scalable Displays", Greg Humphreys, et al., Conference on high performance networking and computing, Proceedings of the 2000 ACM Conference on Supercomputing Article No. 30, 2000, pp. 1-8 (8 pages).

"Optimized Geometry Compression for Real-time Rendering", Mike M. Chow, Proceedings Visualization '97, Oct. 19-24, 1997, Annual IEEE Conference on Visualization (pp. 347-354) (8 pages).

United Kingdom Examination Report dated Feb. 24, 2005 (3 pages).

Search Report dated Aug. 27, 2002 in GB 0207152.0 (3 pages).

* cited by examiner

Figure 3 - Input Data Organisation

Figure 4 - Processing of Indices by Tiling

Figure 5 - Vertex Buffer Organisation

Figure 6 - Display List Organisation

Figure 7 - Compression of Attributes

DISPLAY LIST COMPRESSION FOR A TILED 3-D RENDERING SYSTEM

BACKGROUND TO THE INVENTION

This invention relates to a 3-dimensional computer graphics rendering system and in particular to a system of the type in which a scene to be rendered is subdivided into a plurality of rectangular areas or tiles, each of which is processed in turn for all the objects which intersect it.

Figure 1:
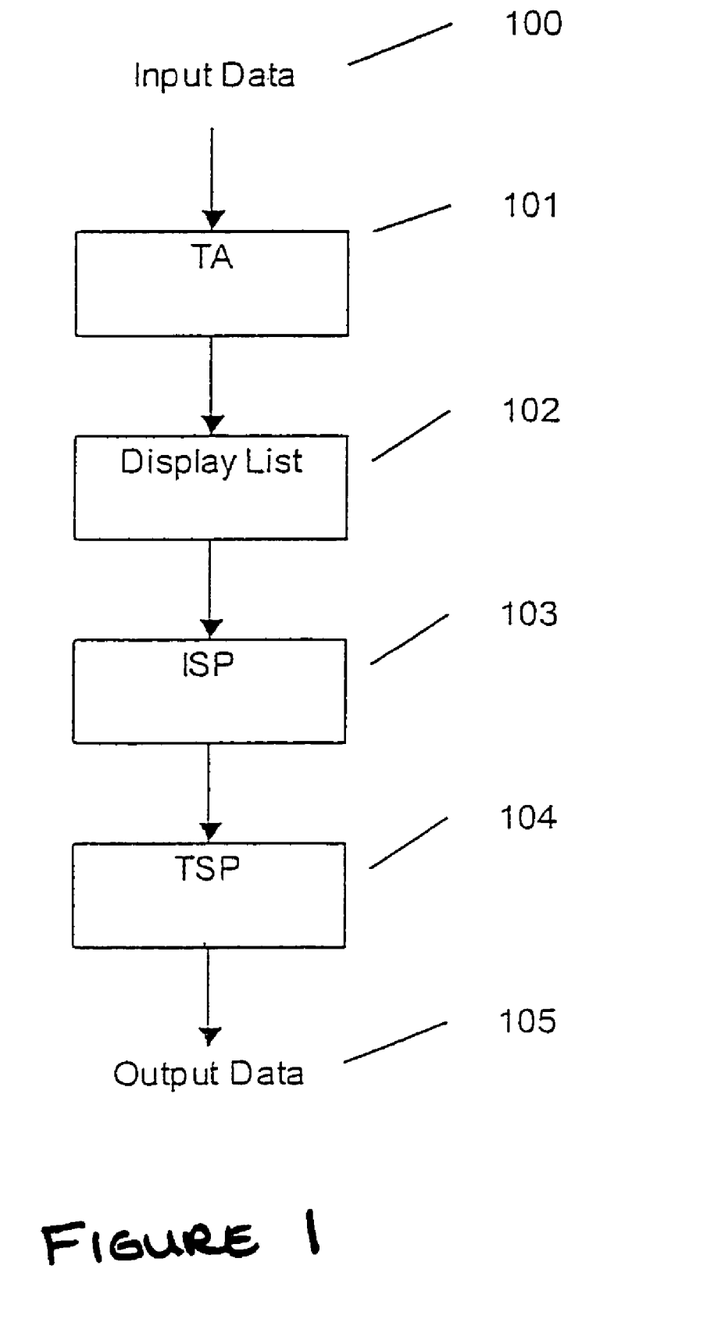
FIG. 1 is the prior art rendering system described above.

FIG. 1 shows a prior art 3-D rendering system.

The system takes a three-dimensional description of a scene 100 and generates a two-dimensional representation of the scene 105 that can be displayed on an output device such as a computer monitor.

For the purposes of efficient operation, the system subdivides the two dimensional representation of the scene into regions referred to as tiles.

The objects in the three-dimensional scene are processed by a Tile Accelerator 101 and data defining then is stored in a display list 102. The display list contains all the vertex and control data required to render the scene. The vertex data is typically stored as vertex strips.

For each tile comprising the scene space, an Image Synthesis Processor (ISP) 103 reads the display list corresponding to that tile and determines which parts of scene are visible. This information is then passed on to a Texturing and Shading processor (TSP) 104 to be rendered.

A further refinement is to group regions of tiles together into macrotiles. Instead of generating a display list for the entire scene, the tile accelerator generates a display list for each macrotile. This has the advantage that if all the display list memory has been consumed, then a macrotile can be rendered and the display list memory associated with it reclaimed for use by the system. The disadvantage is that when objects in the scene span multiple macrotiles they may have vertex data replicated in each macrotile display list.

The majority of non-tiled 3D graphics systems have an immediate mode rendering architecture. Immediate mode rendering does not need to store a description of the entire scene in the display list, and instead primitives are rendered as they are presented to the system. Immediate mode rendering has the advantage of avoiding the storage requirements of the display list, but it precludes the considerable optimisations that are possible with tiled architectures, such as deferred texturing and translucency sorting.

The complexity of scenes to be rendered is increasing as powerful, low-cost rendering systems become more prevalent. This presents a problem for tiled renderers because the display list storage and bandwidth requirements also increase.

SUMMARY OF THE INVENTION

Embodiments of the present invention provide a method and apparatus for reducing the size and memory bandwidth required for the display list, which will allow tiled rendering systems to be implemented at lower cost.

Specific embodiments of the invention collect blocks of screen space vertex data in the Tile Accelerator and reduce the amount of storage and bandwidth required to store the data by exploiting the spatial relationships between them. This is done determining a set of origin values and storing the attributes of the vertices as delta (or difference) values relative to the origin values.

Preferred embodiments also use a scheme for compactly describing indexed primitives in the display list that improves the number of times a vertex can be reused in a scene over traditional methods, such as strips, while preserving locality of reference.

The invention is defined in its various aspects with more precision in the appended claims to which reference should now be made.

BRIEF DESCRIPTION OF THE DRAWINGS

Specific embodiments of the invention will now be described in detail by way of example with reference to the accompanying drawings in which.

DETAILED DESCRIPTION OF PREFERRED EMBODIMENTS

Figure 2:
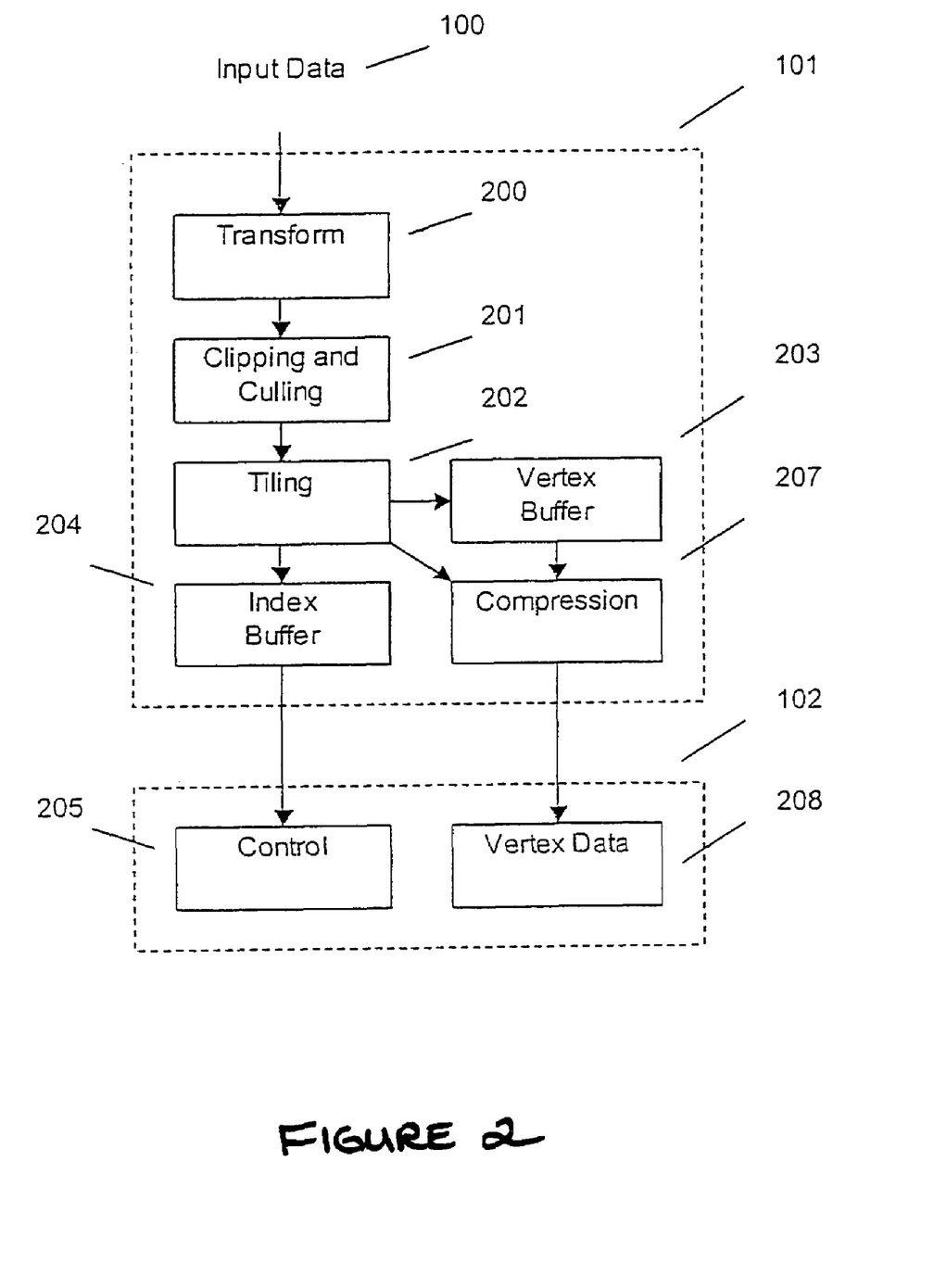
FIG. 2 is a block diagram of a tile accelerator embodying the invention.

FIG. 2 illustrates the processing stages and data flow of a tile accelerator with vertex data compression in an embodiment of the invention.

Input data 100 contains a description of scene to be rendered. This includes the vertices that define the scene, a description or how vertices should be assembled into primitive objects such as lines and triangles, and state information describing the manner in which they should be rendered. The state information includes information about how to rasterise, texture and shade the primitive objects. In the embodiment, the state information includes the state specified by OpenGL and Direct X both of which are industry standard application programming interfaces The Tile Accelerator 101 reads and processes vertices according to a list of rendering commands in the input data.

Figure 3:
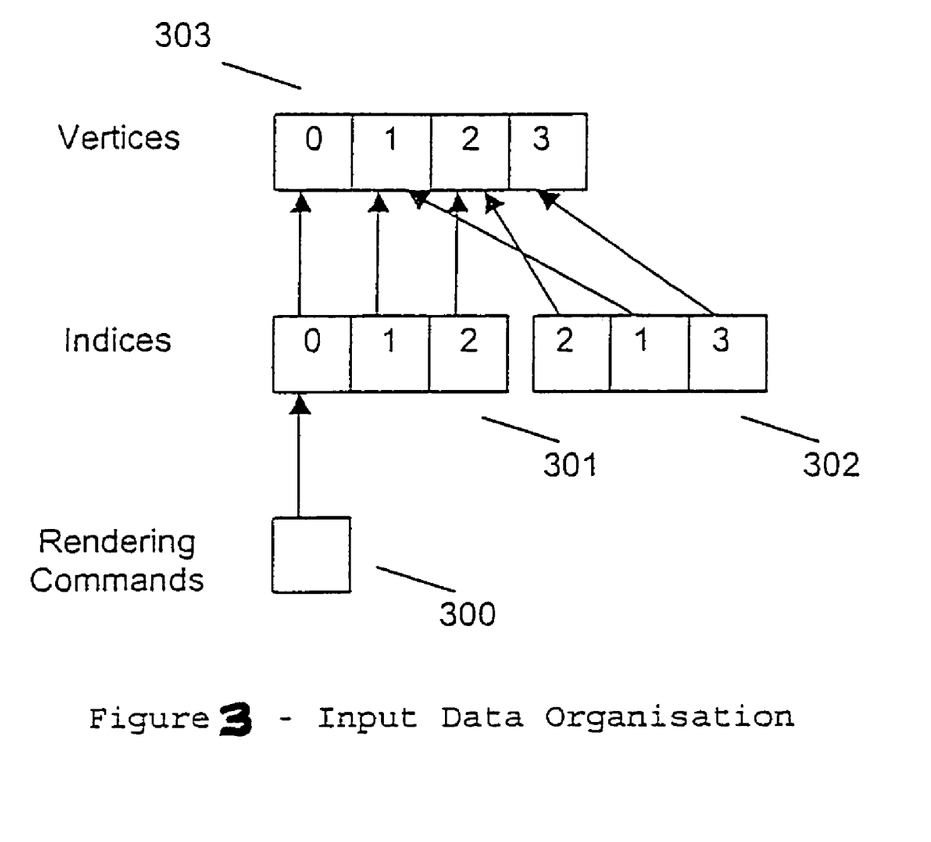
FIG. 3 shows the input data organisation inside the embodiment of FIG. 3.

FIG. 3 shows a possible configuration of the input data. The rendering commands 300 indicate that two triangles are to be drawn and the state information defines how they are to be rendered. In this configuration, the application derives two triplets of indices 301 and 302 each of which describes which of the vertices 303 comprises its respective triangle.

Other configurations for describing how primitives should be assembled from a list of vertices, such as lists of indices describing triangle strips or fans are also possible. The description of other types of primitives, such as quads and lines is also possible by using fewer or additional index values. In some configurations, the list of indices may be implied and generated internally by the system.

It can be seen that the use of indices permits individual vertices to be referenced by a greater number of primitives in the scene than would otherwise be possible with strips. As will be shown below, the system allows indices to be stored compactly in the display list. In the preferred embodiment, sets of indices are used throughout the system to describe how primitives are formed.

As instructed by the rendering commands, in FIG. 2 the system reads vertices and passes them to a transform processor 200 for conversion into clip space coordinates. This can be implemented as a fixed function transformation and lighting logic or as a programmable logic taking a sequence of operations that are the applied to the vertices. In the embodiment, the transformation process is programmable and includes vertex blending and the tessellation of high order surfaces into primitive objects. In some situations, the input data supplied to the rendering system may already be in screen space and so no transformation needs to be applied to the data. In some implementations, transformation may always be performed prior to the vertex data being supplied to the rendering system and the transform function may not be required at all.

Clipping and culling 201 takes transformed vertices and index information and performs clipping against front, rear or arbitrary clip planes and culling of primitives based on whether they are front or rear facing. In the embodiment, the final transformation of vertices to screen space is performed here.

Tiling Unit 202 receives indices and vertices from the clipping and culling process. The transformed and clipped vertices are placed into a vertex buffer 203 and the indices placed in an index buffer 204. The tiling process then uses the indices to fetch the corresponding vertices' screen coordinates from the buffer and determines which tiles the data contained in the buffer effects.

Figure 4:
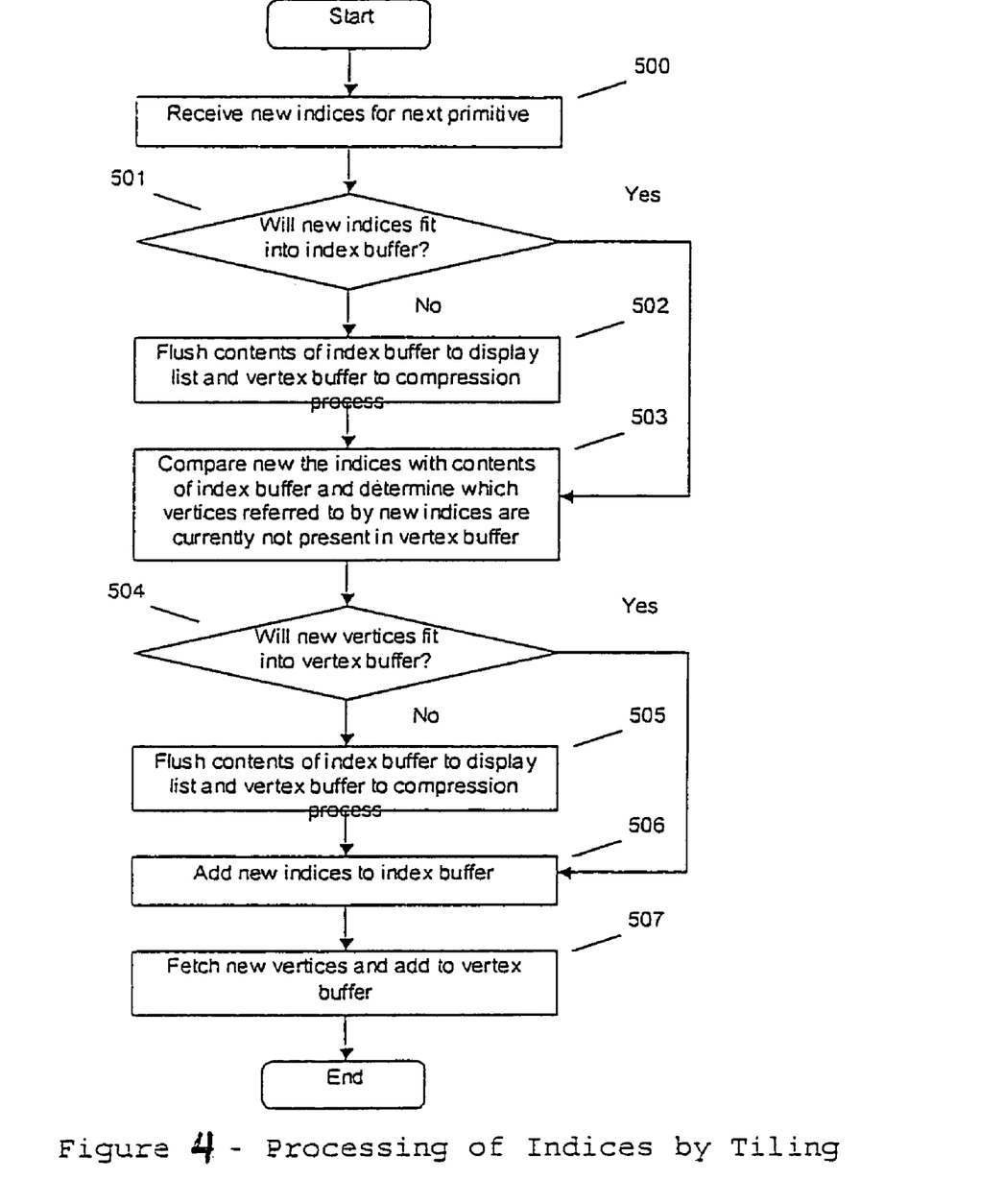
FIG. 4 shows a flow diagram of the processing of indices by tiling in an embodiment of the invention.

In the embodiment, the vertex buffer can store up to 16 vertices and the index buffer up to 96 indices. When these buffers are full, the contents of the vertex buffer are sent to the compression process 207 and the indices sent to the control portion 205 of the display list. FIG. 4 shows the process used to add vertices and indices into these buffers.

The process of FIG. 4 receives new indices for the next primitive at 500 and at 501 determines whether or not the new indices will fit into the index buffer. If they will not, the contents of the index buffer are flushed to the display list and the contents of the vertex buffer to the compression unit 207 at step 502. The process then passes to step 503 which can also be reached directly from step 501 if the new indices do fit into the index buffer. At this stage the new indices are compared with the contents of the index buffer and a determination made as to which vertices referred to by the new indices are currently not present in the vertex buffer. After this a determination is made at 504 as to whether the new vertices determined at 503 will fit into the vertex buffer. If they will not the contents of the index buffer are flushed to the display list and the contents of the vertex buffer to the compression unit 207 at step 505. The process then passes to step 506, which is also passed to from step 504 if the new vertices do fit into the vertex buffer, and the new indices are then added to the index buffer. The process is completed at step 507 where the new vertices are fetched and added to the vertex buffer.

Figure 5:
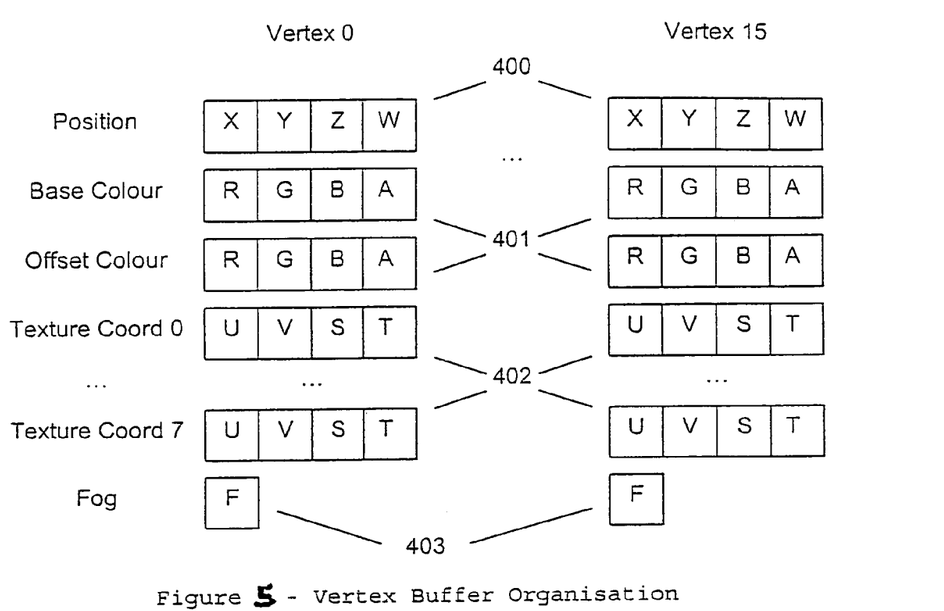
FIG. 5 shows a structure of vertex buffer organisation within the tile accelerator of FIG. 2.

Each vertex in the vertex buffer can have a number of attributes associated with it. In the preferred embodiment, each vertex has 45 IEEE floating point format attribute values consisting of four position attributes (X, Y, Z, W), two groups of colour attributes (R, G, B, A) referred to as base and offset colours, eight groups of texture coordinates (U, V, S, T) and a fog value. FIG. 5 illustrates the organisation of the vertex buffer.

The vertex position 400 indicates the screen space coordinates of the vertex. This data is required to rasterise the scene and determine the visibility of objects. The remaining data, including the base and offset colours 401, texture coordinates 402 and fog value 403 are used during texturing and shading.

Note that the system can be configured so that Z represents the distance from the eye to the point represented by the vertex or so that Z is the distance from the front plane.

During the tiling process, it is possible for primitives to be culled because they are entirely off screen or do not cover any of the points where pixels are to be sampled. After culling primitives, the tiling process examines the indices of the remaining primitives and determines which vertices are still referenced. This information is forwarded to the compression process in the form of a mask. Note that if macrotiling is used, this information can be passed to the compression module on a per macrotile basis for each macrotile that the contents of the vertex buffer effects.

When the limit of the number of vertices that can be stored in the vertex buffer or the number of indices that can be buffered in tiling is or the last vertex of a primitive, or the end of the scene is reached, the contents of the vertex buffer are flushed and sent to the compression process and the indices describing the primitives are written into the control portion of the display list 205.

The state information is placed in the control portion of the display list by the tiling process. In the preferred embodiment, state information in the input data to the system is tagged with a tag between 1 and 63. The tiling process records the current tag and the tag of the last state written into each tile. When it is determined that a primitive effects a particular tile, the last tag written into that tile is compared against the current tag. If the numbers do not match, the state information is inserted into the control data of that tile and the record of the last tag for that tile is updated. At the beginning of each frame or after 63 tags have been submitted to the system, the record of the last tag written to each tile is cleared to zero.

Figure 6:
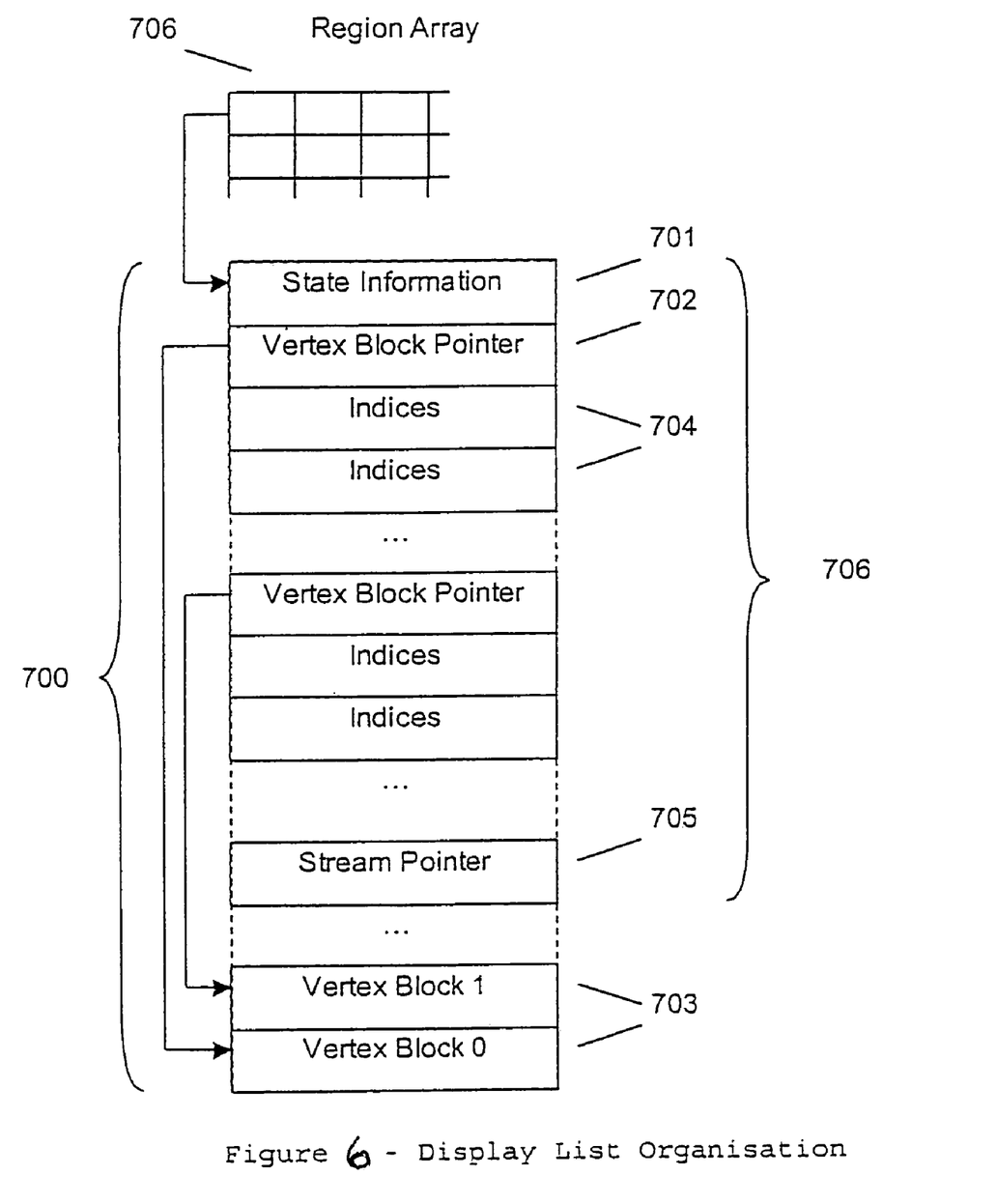
FIG. 6 shows schematically the organisation of the display list in the embodiment of the invention.

FIG. 6 illustrates the organisation of the display list. Each tile in the display list has its own steam or control data. A region array 706 holds a pointer to the start of the control data for each tile.

The part of the display list containing control and vertex data is divided into memory blocks 700 which are typically memory page sized. During the tiling process, the per-tile control data 706 are written into ascending addresses in memory blocks and blocks of vertex data 703 are written into descending memory addresses. When all space in a memory block has been used, a new memory block is allocated. In this manner, locality of reference is improved because vertex data can be stored in the same memory block as the control data that refers to it.

During the tiling process, a memory array is used to record the location in the display list of the memory blocks where control data for each tile should be appended. If macrotiling, there is one memory block being filled per macrotile.

The control data includes state information 701, vertex block pointers 702, indices 704 and stream pointers 705.

In the embodiment, state information that is only required by the ISP is stored directly in the control data. State information that is required by the TSP is written once into the display list and a reference to it is placed in the control data.

To reduce the amount of display list storage required for TSP state information it is split into three portions: object state that is shared across a large number of objects, texture state that typically changes frequently, and blending state that is typically large but shared across many objects. In this manner, the texture state can change frequency without it being necessary to replicate the large blending state each time.

Vertex block pointers identify the block of vertex data that will be subsequently used to draw primitives. In the preferred embodiment this includes a description of the type of primitives to be drawn from the buffer. This includes lines, points, filled triangles and outline triangles.

To reduce the amount of display list storage, indices written into the control data are mapped by means of an associative memory into a range between zero and the number of vertices stored in the vertex buffer. In the, embodiment, the indices written into the control data are 4-bit values.

The control data for a tile is written into memory blocks in sequential memory addresses. Each memory block may contain control data for multiple tiles, and the control data for a tile may span multiple memory blocks. At the end of each sequence of control data, the tiling process inserts a stream pointer either to identify the address in the display list where the control data continues or to indicate the end of the control data for a tile.

Compression unit 207 in FIG. 2 examines the attributes of the vertices stored in the vertex buffer and attempts to exploit the spatial relationships between them to reduce their storage and memory bandwidth requirements. In the embodiment, blocks of attributes are compressed by storing them as delta or difference values relative to an origin value. The origin value and the delta values for all vertices in the block are stored in the vertex data in the display list.

Figure 7:
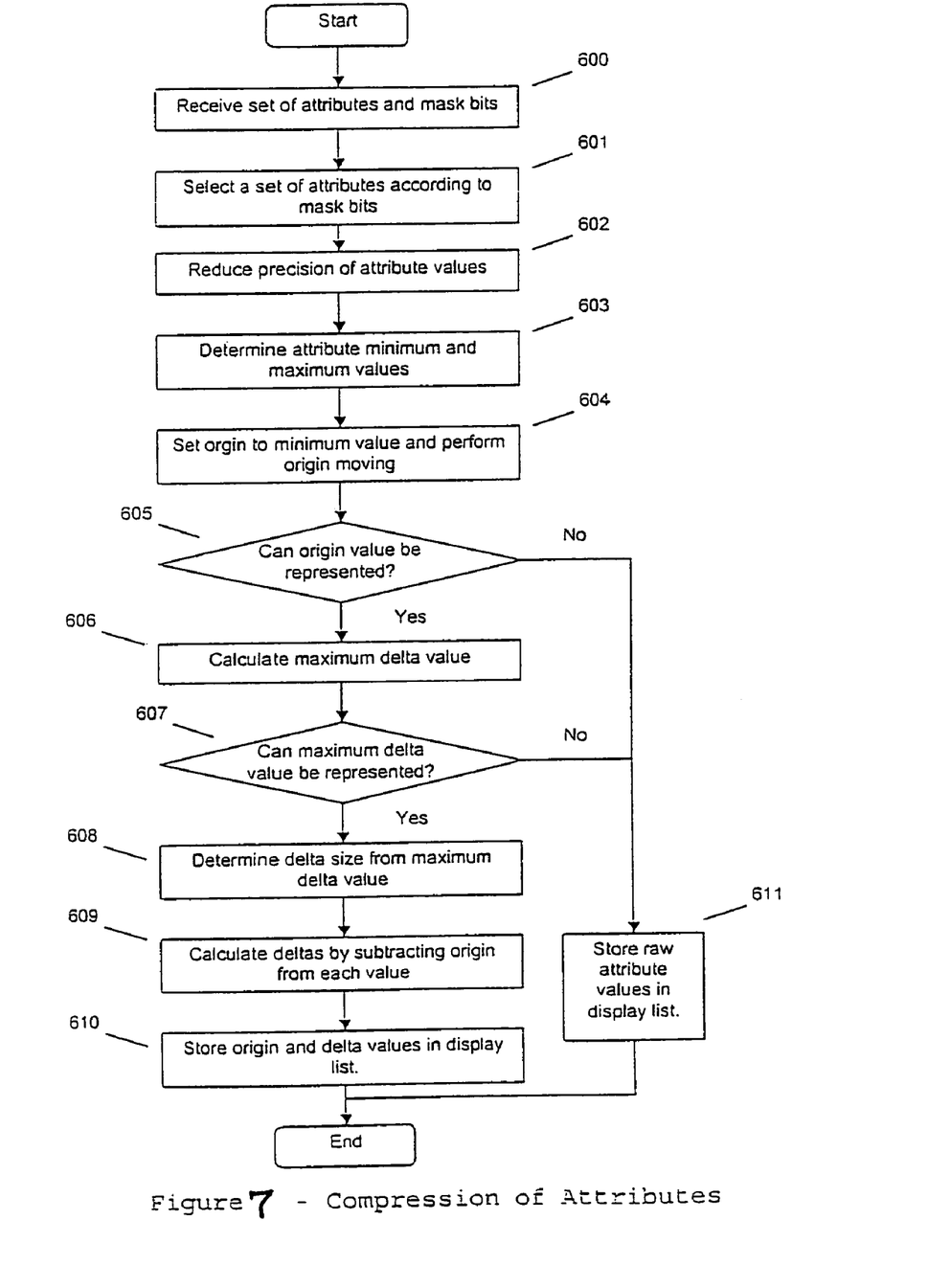
FIG. 7 is a flow diagram showing how attributes are compressed.

FIG. 7 illustrates the process of compressing vertex attributes. The process is performed for each attribute for each vertex that is to be compressed. The result is that each set of attributes is either written out in compressed format as a set of delta values and an origin value or in raw "uncompressed" format as a set of 32-bit IEEE floating point values (for all attributes expect R, G, B and A attributes) and 8-bit integers (for R, G, B and A attributes). Note that the tile accelerator can be configured to process only a subset of possible attributes. Also, in the embodiment fog values are not compressed, however they could be processed in a similar manner as for the other attributes.

At 600, a set of attributes is received from the vertex buffer along with a set of mask bits from tiling, indicating which of the attributes should be processed.

At 601, attributes that do not have the corresponding mask bit are discarded from further processing. In some implementations of the system, the mask is not used and all attributes are always processed.

At 602 the attribute values are reduced to some amount of fractional accuracy, which is referred to as snapping. The amount of precision retained depends on the attribute type and on how the compression process has been configured. For the embodiment, Table 1 shows the attributes that are truncated and the number of fractional or mantissa bits preserved.

TABLE 1

| Position | X, Y | 4 fractional bits |
|---|---|---|
| | Z | 24 mantissa bits |
| | W | 20 mantissa bits |
| Texture Coordinate | U, V, S | 8-23 fractional bits |
| | T | 20 mantissa bits |

The number of fractional bits preserved for X, Y can be relatively small because the position in screen space is typically sampled at integer coordinates and because of inaccuracies introduces during transformation. Sufficient Z accuracy must be maintained for Z artefacts not to occur.

Note that for texture coordinates, the number of fractional bits preserved is configurable. The compressor is typically configured to preserve log2(dim)+8 fractional bits, where dim is the maximum dimension in texels of texture maps associated with that attribute and log2 is the logarithm in base 2. The number of fractional bits preserved can be reduced to improve the compression ratio at the expense of accuracy.

In the embodiment, floating point colour values between 0 and 1.0 are converted to unsigned 8-bit integer values multiplying by 255 or by multiplying by 250 and clamping.

The compression process can be configured to disable the compression of particular attributes. This forces the attribute to be stored in raw format and no snapping is performed.

At 603 the minimum and maximum values of the set of snapped attributes is determined.

At 604 the minimum value is selected as an origin value.

Texture maps are frequently sampled so that only the fractional part and sometimes the odd/even value of the texture coordinate is significant. For texture coordinates that are used in this manner, the compression process can be configured to discard the most significant bits of the origin values, equivalent to adding or subtracting a multiple of 1 or 2, and thus move it closer to zero. Reducing the magnitude of the texture coordinate origin values in this manner can reduce the amount of storage required for the texture coordinate origins.

If macrotiling is being performed, the X and Y attributes can have the macrotile corner closest to the origin of the macrotile subtracted from them.

Some attributes may have restrictions on the magnitude of the origin values that can be represented in the compressed format. In the preferred embodiment, texture coordinate origin values are restricted to values between $-2^{16}$ and $+2^{16}$ and Z, W and T origin values are restricted to being positive.

At 605 the compression process determines if the origin value can be represented. If the texture coordinate origin value is outside the range that can be represented, the attributes are not compressed and the "raw" 32-bit IEEE format float value of the attributes are stored in the display list at 611.

To simplify the encoding and decoding of the compressed memory format, the decision to store an attribute in raw format can force related attributes to also be stored in raw format. For example, if the compression process decides to store any of X, Y or Z in raw format, then all attributes in the set could be stored in raw format. Similarly, for each group of texture coordinates, if any of U, V, S or T is stored in raw format, then all texture coordinate attributes for that group could be stored in raw format.

Note that if a set of attributes is stored in raw format, the origin value is not used.

At 606 the maximum delta or difference value of each attribute is calculated by subtracting the minimum value from the maximum.

At 607 the magnitude of the maximum delta value for each attribute is examined and it is determined whether the delta value exceeds the maximum value that can be represented in compressed form.

In the preferred embodiment, the compressed format delta values for all X, Y, U, V and S attributes are stored as fixed-point delta values. Table 2 shows the magnitude at which deltas can no longer be represented in the compressed format.

TABLE 2

| Position | X, Y | Fixed point | $2^{12}$ |
|---|---|---|---|
| | Z | Floating point | 16 mantissa bits |
| | W | Floating point | 16 mantissa bits |
| Colour | R, B | Integer | $2^4$ or $2^5$ |
| | G | Integer | $2^4$ or $2^6$ |
| | A | Integer | $2^4$ or 0 |
| Texture Coordinate | U, V, S | Fixed point | 8-23 fractional bits |
| | T | Floating point | 16 mantissa bits |

The colour delta values R, G, B and A are integer quantities in the range 0 to 255. In the preferred embodiment, groups of colour delta values are stored in a single 16-bit block. If the A attributes are not all 255, the magnitude at which the R, G, B and A delta values can no longer be represented is $2^4$. If the A attributes are all 255, the values for R and B are $2^6$ and $2^6$ for B.

The Z, W and T attributes are stored as floating point values. The delta values are stored as a mantissa value relative to the exponent of the origin. The number of mantissa bits preserved in the delta values is the same as the number used when snapping. Note that as the origin is the minimum value, storing mantissa values relative to this exponent preserves all possible mantissa accuracy.

At 608 the magnitude of the maximum delta value is used to determine the size of the attribute deltas to be stored in the compressed format. In the preferred embodiment, the compressed format for all attributes in each set have the same delta size, which can be. 0, 8 or 16-bits for X, Y, Z, W, U, V, S and T and 16-bits for groups of colours. Note that this means that each vertex in a block has the same size.

At 609 the delta values for each attribute is calculated by subtracting the origin value from the value of each attribute. The number of bits preserved is as described previously.

At 610 the set of attributes are written into the display list in compressed format as a set of delta values and an origin value.

At 611 the set of attributes are written into the display list in raw format as a set of 32-bit IEEE float values.

Figure 8:
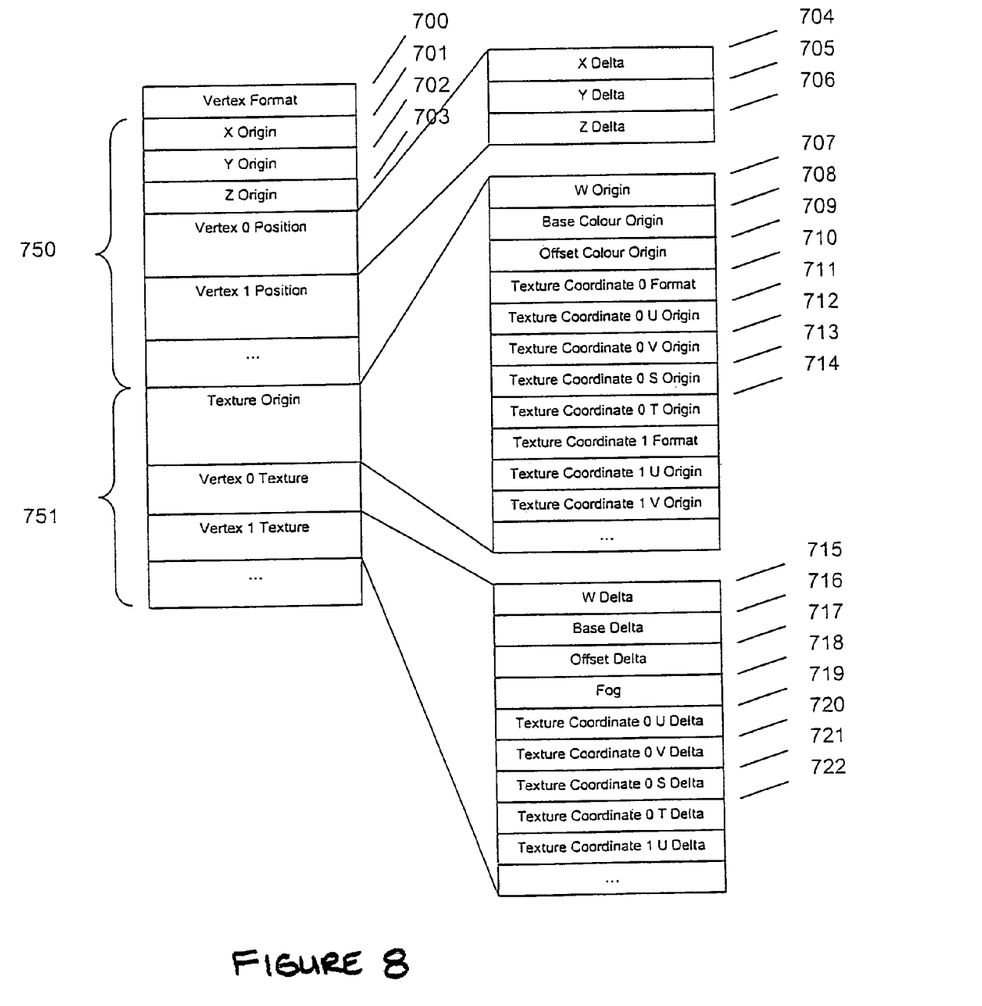
FIG. 8 is a more detailed diagram of vertex organisation.

FIG. 8 illustrates how the compression processes organises the vertex data for each vertex data block in display list memory.

The first part of the vertex data is the Vertex Format 700. This describes some of the vertex data format. In the preferred embodiment this contains: a flag indicating whether the X, Y and Z attribute are stored in raw or compressed format; three fields indicating whether the compressed formats Delta X 704, Delta Y 705 and Delta Z 706 are 8- or 16-bit delta values; three flags indicating whether the W Origin 707, Base Colour Origin 708, Offset Colour Origin 709 are present; a field indicating the number of Texture Coordinate Formats 710 present; a field indicating whether W Delta 715 values are 0, 8- or 16-bit delta or 32-bit raw values; two fields indicating whether Base Delta 716 and Offset Delta 717 are 0, 8- or 16-bit delta or 32-bit raw values; and a flag indicating whether Fog 719 values are present.

The second part of the vertex data 750 contains the position information for the vertices.

If the X, Y and Z attributes are stored in compressed format, the Vertex Format is followed by the X Origin 701, Y Origin 702 and Z Origin 703 values as determined at 604. Following the origin values the vertex data then contains the X Delta, Y Delta, and Z Delta values for all of the vertices in the block as determined at 609.

If the X, Y and Z attributes are in raw format the X Origin, Y Origin and Z Origin values are not used and the Vertex Format is followed by the raw format X, Y and Z attribute values for all vertices in the block. In some implementations, X Origin, Y Origin and Z Origin may always be present.

The third part of the vertex data 751 contains data required for texturing and shading of the vertices. In some implementations this may not be present if the vertices do not require texturing or shading.

The W Origin 707, Base Colour Origin 708, Offset Colour Origin 709 contain the origin values for W and the R, G, B and A origin values for Base Colour and Offset Colour as determined at 604. These origin values are only present if the corresponding flags in the Vertex Format are set.

Zero or more Texture Coordinate Formats may be present. Each describes the format for a group of U, V, S and T attributes. In the preferred embodiment this contains: a flag indicating whether the U, V and S attributes for this group are stored in raw or compressed format; three fields indicating whether U Delta, V Delta and S Delta values for this group are 8- or 16-bit; two flags indicating whether the S and T attributes are present; two fields indicating whether S Delta and T Delta values are 8- or 16-bit.

Each Texture Coordinate Format is followed by U Origin 711, V Origin 712, S Origin 713 and T Origin 614 values as determines in 604. In the preferred embodiment, The U Origin, V Origin and S Origin values are stored as 16-bit floating point numbers with one sign bit, four exponent bits and 11 mantissa bits, and the T Origin is stored as a 32-bit IEEE format floating point number.

Following the Texture Coordinate Formats and U Origin, V Origin, S Origin and T Origin data, is the per-vertex data for the remaining attributes. This includes: W Delta 715, Base Colour Delta 716, Offset Colour Delta 717, Fog 718, and for each group of texture coordinate attributes present U Delta 719, V Delta 720, S Delta 721 and T Delta 722. In some implementations, these values are only present if the corresponding bits in the Vertex Format or Layer Format are set.

Figure 9:
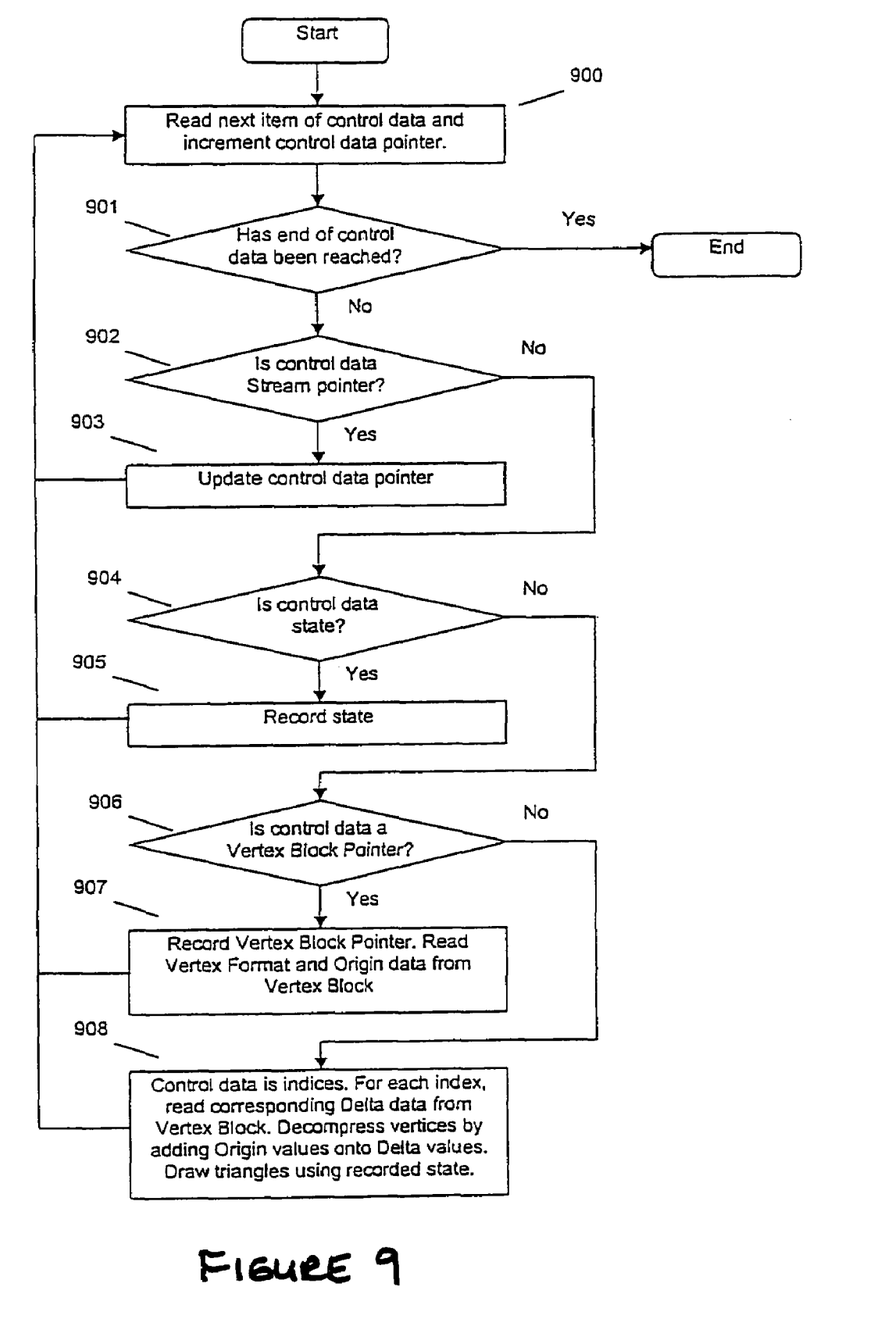
FIG. 9 shows a flow diagram for the retrieval and decompression of vertex data.

Vertex position data is decompressed as the ISP fetches the per-tile control data from the display list. FIG. 9 illustrates the process performed for each tile in the scene. To commence fetching the control stream, a control stream data pointer is initialised to the start of the control stream data from an address stored in a Region Array. At 900 the item pointed to by the control stream pointer is read and the pointer incremented to point to the next item. At 901 the item read is examined to determine if the end of the control stream has been reached. If it has, the ISP data fetch for this tile is complete and either the next tile in the scene should be processed or the scene render is complete. If the end of the stream has not been reached, then at 902 the item is examined to determine whether it is a stream pointer. If it is, then at 903 the control stream data pointer is updated to the address indicated and control is returned to step 901. If the item is not a stream pointer it is examined at 904 to determine whether it is sate. If it is state, the state data is recorded at 905 and control is returned to step 901. If the item is not state, it is examined at 906 to determine if it is a Vertex Block Pointer. If it is then the origin data is read from the vertex block at 907 and control is returned to step 901. If the item is not a Vertex Block Pointer then the item must be indices. In this case, the delta values corresponding to the indices are fetched from the vertex block. The attributes of the vertex are reconstructed by adding the delta values to the origin values.

Note that the data required to decompress a vertex consists of the origin values and the delta values for that vertex. In this way, a single vertex can be fetched without having to fetch the data form all the other vertices in the block.

In the embodiment, Z, W, and T origin values are restricted to being positive. In an alternative implementation of the compression process, the sign of the sets of Z, W and T attributes is recorded and the compression process is performed on the absolute values of the attributes as described about. For each of these attributes, if the compressed format is selected an additional bit containing the original attribute's sign is recorded along with each attribute delta value in the vertex data. Note that this allows compressed floating point values to maintain their sign. If the raw format is selected, the value written into the vertex data includes the original sign.

The invention claimed is:

1. A 3-dimensional computer graphics rendering system comprising:
    means for receiving object data for a scene to be rendered, the object data including vertex data and index data pointing to the vertex data to define object primitives;
    means for sub-dividing the whole scene to be rendered into a plurality of rectangular areas;
    means for assembling object data for each rectangular area in the scene;
    means for compressing the object data for each rectangular area in the scene;
    means for storing the compressed data in a display list memory;
    means for retrieving and decompressing the object data; and
    means for shading and texturing the object data for display.

2. A 3-dimensional computer graphics rendering system according to claim 1 in which the compression means comprises means for deriving difference data relative to an origin for each vertex and the display list memory stores the origin and difference data.

3. A 3-dimensional computer graphics rendering system according to claim 2 including means for deriving difference data determining a plurality of origins and for each vertex derives the difference relative to an origin.

4. A 3-dimensional computer graphics rendering system according to claim 1 in which the means for assembling object data comprises an index buffer into which index data is stored and a vertex buffer into which vertex data is stored.

5. A 3-dimensional computer graphics rendering system according to claim 4 including means to send the contents of the vertex buffer to the compression means and to send the contents of the index buffer and compressed vertex data to the display list memory.

6. A 3-dimensional computer graphics rendering system according to claim 5 in which the data is sent to the compression means and the display list memory in dependence on the amount of data stored in the index buffer.

7. A 3-dimensional computer graphics rendering system according to claim 5 in which the data is sent to the compression means and the display list memory in dependence on the amount of data stored in the vertex buffer.

8. A 3-dimensional computer graphics rendering system according to claim 1 in which the display list memory comprises a plurality of memory blocks and the means for storing data in the display list memory comprises means for writing control data associated with each vertex in each rectangular area from one end of the memory block and writing vertex data associated with the control data for the same rectangular area in the same memory block from the opposite end of the memory block.

9. A 3-dimensional computer graphics rendering system according to claim 8 in which the memory blocks each comprise a memory page.

10. A 3-dimensional computer graphics rendering system according to claim 1 in which each vertex has a plurality of image attributes associated with it and the compression means comprises means to compress data defining these attributes.

11. A 3-dimensional computer graphics rendering system according to claim 10 in which the attributes comprise position data which is compressed to an origin and difference value.

12. A 3-dimensional computer graphics rendering system according to claim 10 in which the attributes comprise at least on of: texture attributes; vertex positions, colours and; fog values.

13. A 3-dimensional computer graphics rendering system according to claim 11 in which only some of the attributes are compressed.

14. A 3-dimensional computer graphics rendering system according to claim 12 in which the compressed texture attributes are stored as floating point values.

15. A 3-dimensional computer graphics rendering system according to claim 1 including means for associating a plurality of tag values to each rectangular area.

16. A 3-dimensional computer graphics rendering system according to claim 15 including means for updating the tags.

17. A 3-dimensional computer graphics rendering system according to claim 15 wherein data is inserted into a rectangular area if tag values associated with the incoming data do not match tag value currently associated with that area.

18. A method for rendering a 3-dimensional computer graphics image comprising the steps of:
    receiving object data for a scene to be rendered, the object data including vertex data and index data pointing to the vertex data to define object primitives;
    subdividing the whole scene to be rendered into a plurality of rectangular areas;
    assembling object data for each rectangular area in the scene;
    compressing the object data for each rectangular area;
    storing the compressed object data for each rectangular area in a display list memory;
    retrieving and decompressing the object data; and shading and texturing the object data for display.

19. A method according to claim 18 in which the compressing step comprises deriving difference data relative to an origin for each vertex and the storing step comprises storing the origin and difference data in the display list memory.

20. A method according to claim 18 in which the step of assembling object data for each rectangular area comprises the steps of writing index data to an index buffer and writing vertex data into a vertex buffer.

21. A method according to claim 20 including the steps of sending the contents of the index buffer for compression and sending the contents of the index buffer and compressed vertex data to the display list memory.

22. A method according to claim 21 in which the data sent for compression and the data sent to the display list memory is sent in dependence on the amount of data stored in the index buffer.

23. A method according to claim 21 in which the data sent for compression and to the display list memory is sent in dependence on the amount of data stored in the vertex buffer.

24. A method according to claim 20 in which the display list memory comprises a plurality of memory blocks and the step of storing data in the display list memory comprises writing control data associated with each vertex in each rectangular area from one end of a memory block in the display list memory and writing the corresponding vertex data associated with the control data for the same rectangular area in the same memory block from the opposite end of the block.

25. A method according to claim 20 in which each vertex has a plurality of image attributes associated with it and the compressing step comprises compressing data defining these attributes.

26. A method according to claim 25 in which the attributes comprise position data which is compressed to an origin and difference value.

27. A method according to claim 25 in which the attributes comprise at least one of: texture coordinates; vertex positions; colours; and, fog values.

28. A method according to claim 25 in which only some of the attributes are compressed.

29. A method according to claim 27 in which the compressed texture attributes are stored as floating point values.

30. A method for storing vertex and index data representing object primitives in a scene to be rendered comprising the steps of:

subdividing the whole scene into a plurality of rectangular areas;

storing the vertex data and associated control data for object primitives in each rectangular area in memory blocks in a display list memory, wherein the control data associated with the vertexes in each rectangular area is stored in memory addresses commencing at one end of a memory block while the associated vertex data in the same rectangular area is stored in the same memory block commencing with memory addresses from the opposite end of the memory block, wherein one set of memory addresses is an ascending set of memory addresses and the other set of memory addresses is a descending set of memory addresses.

31. A 3-dimensional computer graphics rendering system, comprising:

means for receiving object data for a scene to be rendered, the object data including vertex data and index data pointing to the vertex data to define object primitives;

means for sub-dividing the entire scene to be rendered into a plurality of rectangular areas independent of object data;

means for assembling object data for each rectangular area in the entire scene;

means for compressing the object data for each rectangular area in the entire scene;

means for storing the compressed data in a display list memory;

means for retrieving and decompressing the object data; and means for shading and texturing the object data for display.

* * * * *